US008453248B2

(12) United States Patent
Morvan et al.

(10) Patent No.: US 8,453,248 B2
(45) Date of Patent: May 28, 2013

(54) METHOD AND DEVICES FOR VIDEO PROCESSING RIGHTS ENFORCEMENT

(75) Inventors: Michel Morvan, Parthenay de Bretagne (FR); Alain Durand, Rennes (FR); Frédéric Lefebvre, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 836 days.

(21) Appl. No.: 12/215,620

(22) Filed: Jun. 27, 2008

(65) Prior Publication Data

US 2009/0013189 A1 Jan. 8, 2009

(30) Foreign Application Priority Data

Jun. 28, 2007 (EP) .................................. 07301176

(51) Int. Cl.
*G06F 21/00* (2006.01)
(52) U.S. Cl.
USPC ............................................ 726/26; 713/176
(58) Field of Classification Search
USPC .............................. 713/176; 726/2, 22, 26, 27
See application file for complete search history.

(56) References Cited

U.S. PATENT DOCUMENTS

| 6,848,052 | B2 | 1/2005 | Hamid et al. | |
|---|---|---|---|---|
| 8,094,872 | B1 * | 1/2012 | Yagnik et al. | 382/100 |
| 2003/0009687 | A1 * | 1/2003 | Ferchau et al. | 713/200 |
| 2003/0051150 | A1 * | 3/2003 | Jung | 713/189 |
| 2003/0088775 | A1 | 5/2003 | Weimerskirch | |
| 2003/0152225 | A1 * | 8/2003 | Kunisa | 380/210 |
| 2003/0154377 | A1 * | 8/2003 | Hirai et al. | 713/176 |
| 2004/0010692 | A1 * | 1/2004 | Watson | 713/176 |
| 2004/0267824 | A1 * | 12/2004 | Pizzo et al. | 707/200 |
| 2005/0238324 | A1 | 10/2005 | Kitani et al. | |
| 2006/0078312 | A1 | 4/2006 | Murata et al. | |
| 2006/0153433 | A1 | 7/2006 | Lo | |
| 2006/0248569 | A1 * | 11/2006 | Lienhart et al. | 725/135 |

FOREIGN PATENT DOCUMENTS

| EP | 1 424 695 A | 6/2005 |
|---|---|---|
| GB | 2423882 | 9/2006 |
| WO | WO 2004/034325 A1 | 4/2004 |

OTHER PUBLICATIONS

Roberts, D.K., "Security Camera Video Authentication," Philips Research, Prof. Hotstlaan 4, 5656 AA, Eindhoven, The Netherlands, IEEE, 2002, pp. 125-130.
Search Report Nov. 14, 2007.
Lin, Chung-Yung, "A Robust Image Authentication Method Distinguishing JPEG Compression from Malicious Manipulation", IEEE Transactions on Circuits and Systems of Video Technology, vol. 11, No. 2, Feb. 2001, pp. 153-168.

* cited by examiner

*Primary Examiner* — Gilberto Barron, Jr.
*Assistant Examiner* — David Le
(74) *Attorney, Agent, or Firm* — Myers Wolin, LLC

(57) ABSTRACT

A system for protection against unauthorized modifications of digital content, in particular image content, in which a content processing system retrieves content, a fingerprint for the content and at least one modification limit expressing authorized modifications to the content. The content may then be modified, but before saving or exportation is allowed, a second fingerprint is calculated, and the difference between the fingerprints is compared with the at least one modification limit. If the difference is within the allowed bounds, then saving or exportation is allowed; if not, it is prevented. Also provided are a method and a content consumer device performing essentially the same steps before allowing rendering of the content.

13 Claims, 3 Drawing Sheets

METHOD AND DEVICES FOR VIDEO PROCESSING RIGHTS ENFORCEMENT

This application claims the benefit, under 35 U.S.C. §119, of European Patent Application No. 073011746.9 filed Jun. 28, 2007.

FIELD OF THE INVENTION

The invention is generally directed to digital content protection, and more specifically to detection and protection against unauthorized modifications of digital content.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Digital content, such as for example music and video (of which the latter will be used as an illustrative example hereinafter), is by nature easy to modify. Such modifications may be done at practically any point in the content distribution chain, but such modifications are not always desired by the content creator and/or the content owner. However, the prior art proposes no solutions for controlling modifications to content.

It can thus be appreciated that there is a need for a solution that allows detection, and possibly also restrict, of such modifications.

The present invention provides such a solution.

SUMMARY OF THE INVENTION

In a first aspect, the invention is directed to a method for detecting modifications to digital content. The digital content, a first fingerprint calculated for the digital content, and at least one limit value for the digital content are received. A modification value expressing modifications made to the digital content, the value being based on a present version of the content and the first fingerprint, is calculated and compared with the modification value with the at least one limit value to detect if any modifications to the digital content is within the limits set by the at least one limit value.

In a preferred embodiment, the digital content is modified to produce modified content; in the calculating step, the present version of the digital content is the modified content.

In a further preferred embodiment, the digital content is exported only if it is detected that any modifications to the digital content is within the limits set by the at least one limit value.

In a further preferred embodiment, the modification value is calculated based on a second fingerprint calculated for the present content and the first fingerprint. It is advantageous that the calculation uses a function chosen from the group of: L1 norm, L2 norm, and inter-correlation.

In another preferred embodiment, the digital content comprises at least one image. It is particularly advantageous for video content.

In yet another preferred embodiment, the digital content is erased if it is detected that any modifications to the digital content is without the limits set by the at least one limit value.

In yet another preferred embodiment, exporting the digital content comprises an action chosen from the group of: sending the digital content, saving the digital content, and rendering the digital content.

In a second aspect, the invention is directed to a device for detecting modifications to digital content. The device comprises at least one input interface adapted to receive the digital content, a first fingerprint calculated for the digital content, and at least one limit value for the digital content. The device further comprises a processor adapted to calculate a modification value expressing modifications made to the digital content, the value being based on a present version of the content and the first fingerprint; and compare the modification value with the at least one limit value to detect if any modifications to the digital content is within the limits set by the at least one limit value.

In a preferred embodiment, the device further comprises at least one output interface adapted to export the digital content, and the processor is adapted to export the digital content via the at least one output interface only after detecting that any modifications to the digital content is within the limits set by the at least one limit value.

In a further preferred embodiment, the processor is adapted to calculate the modification value based on the first fingerprint and a second fingerprint calculated on the present digital content.

In yet a further preferred embodiment, the at least one input interface comprises a reader for a portable security module.

In a third aspect, the invention is directed to a device for sending digital content, comprising a processor adapted to calculate a fingerprint for the digital content, and at least one limit value expressing the limit of allowed modifications to the digital content; and at least one interface adapted to output the digital content, the fingerprint for the digital content, and the at least one limit value.

BRIEF DESCRIPTION OF THE DRAWINGS

Preferred features of the present invention will now be described, by way of example, with reference to the accompanying drawings, in which.

DETAILED DESCRIPTION OF PREFERRED EMBODIMENTS

Figure 1:
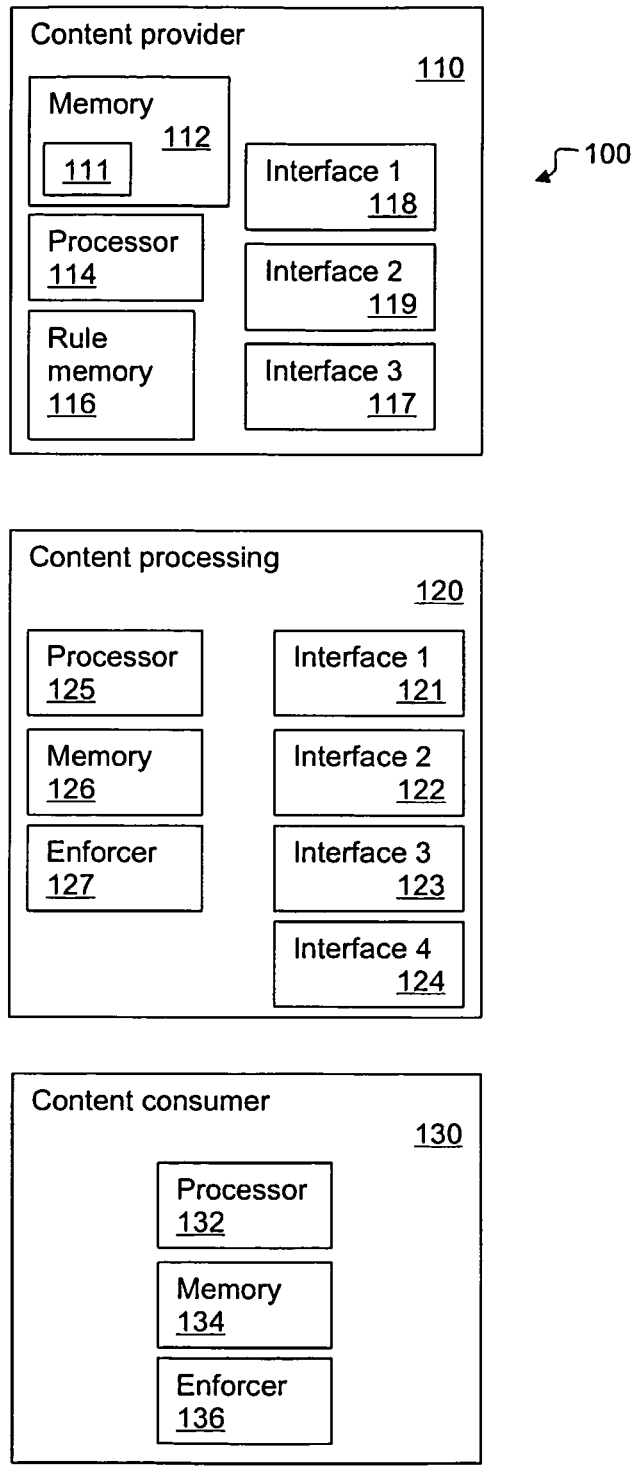
FIG. 1 illustrates a system for content modification detection and protection according to a preferred embodiment of the present invention.

FIG. 1 illustrates a system for content modification detection and possibly also protection according to a preferred embodiment of the present invention. The system 100 comprises a content provider system 110, a content processing system 120, and a content consumer device 130. Note that connections have been left out for the sake of clarity.

The content provider system 110 comprises a first memory space 112 for storing content 111, a processor 114, a second memory space 116 for storing at least one modification rule MR, a first interface 118 for receiving such modification rules MR, and a second interface 119 whose role will be described hereinafter with reference to a particular embodiment. The first interface 118 may for example be a user interface or an interface to another device (not shown). The content provider system further comprises a third interface 117 for outputting the digital content 111. The two memory spaces 112, 116 need not necessarily be dedicated memory spaces; in addition, they may be located within a single physical memory.

For the sake of illustration, the content 111 is so-called "initial content" which is meant to indicate that the content 111 is in the form in which it will be distributed by the content provider system 110.

Figure 2:
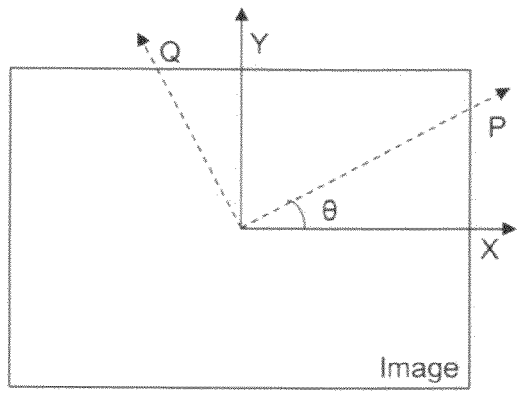
FIG. 2 illustrates radii in an image.

For content 111 that is to be distributed, the processor 114 calculates a sort of check sum known as fingerprint FP. A very simplified fingerprint may for example consist in counting the number of completely black pixels in an image. The prior art teaches many different ways of calculating fingerprints for digital content. The preferred method of calculating a fingerprint is called Radial Soft Hash Algorithm (of which a simplified version has been published as F. Lefebvre, B. Macq, "RASH: RAdon Soft Hash algorithm", European Signal Processing Conference 2002, Toulouse, France) will now be described with reference to FIGS. 2 to 4.

The Radial Soft Hash Algorithm is based on the pseudo-variance of the luminance of the points selected on P-Q image representation. To select a point in P-Q image representation (see FIG. 2), we consider points along a line passing through the image center, and characterized by its angular orientation $\theta$. For an angular orientation $\theta$, the coordinates of a points (x,y) according to (X,Y) axis (original domain) become (p, $\theta$) according to the (P,Q) axis:

$$\begin{bmatrix} p \\ q \end{bmatrix} = \begin{bmatrix} \cos\theta & \sin\theta \\ -\sin\theta & \cos\theta \end{bmatrix} \cdot \begin{bmatrix} x \\ y \end{bmatrix}$$

Figure 3:
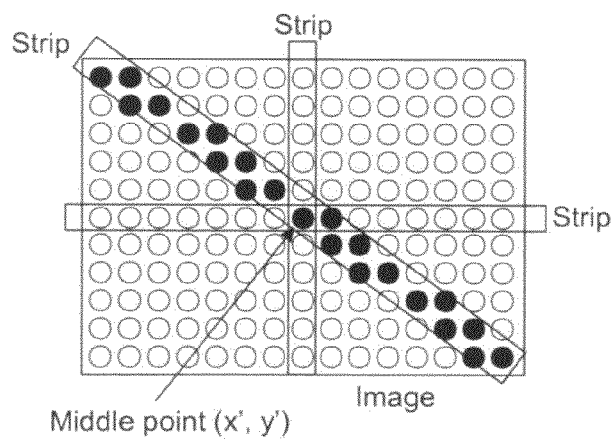
FIG. 3 illustrates a first method of selecting points in an image for a visual fingerprint.

FIG. 3 illustrates the selection of a set of pixels on a line with the orientation $\theta$ passing through the image centre (i.e. middle point (x', y')). Three examples of the discrete version of such a line—called strip—are depicted in the Figure. A first strip, corresponding to $\theta=0$, is horizontal, a second strip, corresponding to $\theta=\pi/2$, is vertical, while a third strip, covering a diagonal of the image, has the selected pixels marked in black for the sake of illustration. The skilled person will appreciate that the strips in the Figure are for illustrative purposes only, and that their width or breadth is not limitative.

According to the algorithm, only the p-axis is used to characterize the pixels of each angular orientation $\theta$. For an angular orientation $\theta$, a points (x,y) is characterized by the couple (p,$\theta$).

For a strip with a pixel width of 1, a point (x,y) is a selected point if its coordinate p satisfies:

$$-0.5 \leq p-p' \leq 0.5 \qquad (1)$$

where (p', $\theta$) are the coordinates of the middle point (x',y') for a same given $\theta$.

Equation (1) may thus also be expressed as:

$$-0.5 \leq (x-x')\cos\theta + (y-y')\sin\theta \leq 0.5 \qquad (2)$$

which, generalized to a strip width of $\eta$, becomes:

$$-\eta/2 \leq (x-x')\cos\theta + (y-y')\sin\theta \leq \eta/2 \qquad (3)$$

Figure 4:
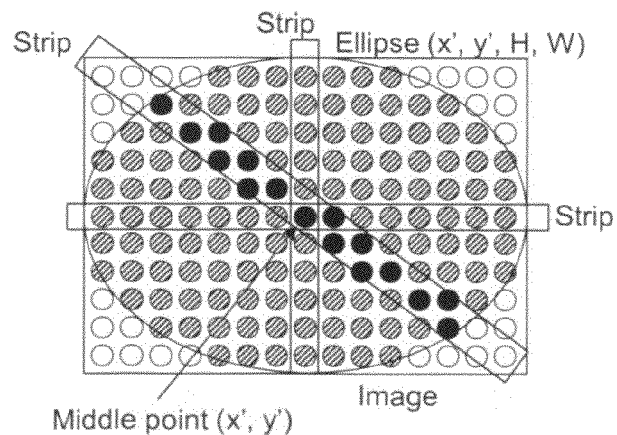
FIG. 4 illustrates a second method of selecting points in an image for a visual fingerprint.

As illustrated in FIG. 4, a preferred version of the algorithm further takes into account the importance of a point in the image. The importance of a point (x,y) in an image can be weighted by the relative position of this point (x,y) to the centre (x',y'), and points that lie outside an imaginary ellipse (that not necessarily extends to, or indeed is limited by, the borders of the image) are discarded. To be chosen, the distance r of a point (x,y) from the ellipse image centre (x',y') shall fulfil:

$$r(x,y) < d(\theta) \qquad (4)$$

where:

$$d^2(\theta) = (H/2)^2 (W/2)^2 / ((H/2)^2 \cos^2(\theta) + (W/2)^2 \sin^2(\theta)),$$
and $$r^2(x,y) = (x-x')^2 + (y-y')^2$$

For any given value of $\theta$, only diagonally striped pixels may be selected. As illustrated for the diagonal strip, only black pixels have been selected. White pixels will be (or have been) rejected.

Using a discretization of 1° for $\theta$, the visual digest for the image is composed of 180 elements. Each element of the visual digest is thus computed by:

$$Elt(\theta) = \frac{1}{N_\theta} \cdot \sum_{p=1}^{N_\theta} (I(p, \theta) - \text{Mean}(\theta))^2, \text{ where}$$

$I(p,\theta)$ is the value of the selected point (p, $\theta$) (for example the luminance of the pixel (p,$\theta$)),
Mean($\theta$) is the classical mean value of $I(p,\theta)$ $$\frac{1}{N_\theta} \cdot \sum_{p=1}^{N_\theta} I(p, \theta),$$

and $N_\theta$ is card($\{p, \theta\}$) (strip width of $\eta$), i.e. the cardinality of the points p, $\theta$.

Finally, the image visual digest of an image i is:

$$VD(i) = \{Elt(\theta)\}, \text{with card}(VD(i)) = 180$$

In case of a single image, the fingerprint FP is equal to VD(i).

For a video sequence comprising a plurality of images, the fingerprint FP is preferably calculated as described in A. Massoudi, F. Lefebvre, C.-H. Demarty, L. Oisel, B. Chupeau, "A Video Fingerprint Based On Visual Digest and Local Fingerprints", IEEE ICIP'07, Atlanta. The calculation is, in brief, performed as follows. A group of n frames is selected. Global image features—typical and unique for each different image content—are extracted from each frame. For each group of n frames, the distance of the successive global image features is computed. The evolution of this distance may be used to detect shot boundaries and stable frames. A shot boundary is a brutal variation of the representative features inside a group of n frames. The set of frames surrounded by two shot boundaries is called a shot. The stable frame presents the smallest distance variation of image features inside a shot. When a stable frame is detected, a set of m robust features are extracted from the stable frame. These m image features, called visual digest, are detected and describe the content. The set of the m features of a stable frame is called shot fingerprint. The video fingerprint is the set of shot fingerprints."

The fingerprint FP and the initial content 111 are then used together with the at least one modification rules MR to calculate at least one modification limit ML. For example, the comparison between two FP and the ML may be calculated using the Euclidean distance, also called L2 norm, but other kinds of comparisons are also possible, such as the L1 norm and correlation (particularly useful to detect rotation). For example, if a particular modification rule MR states that the initial content 111 may not be rotated more than ±3°, the corresponding modification limit ML expresses this modification rule MR as a limit value for the particular initial content; for another content, the modification rule MR may be the same, but it is most likely that the modification limit ML will be different.

The processor 114 then associates the fingerprint FP and the at least one modification limit ML with the content 111. An integrity mechanism such as digital signature is preferably used to guarantee that modification limit ML and fingerprint FP pair cannot be forged for a given content 111. One other way of doing this may for example be to encrypt the content 111 with a first key K1, include the at least one modification limit ML and the fingerprint FP and the first key K1 in a DRM license for the content 111. The DRM license is then encrypted with a second key K2 whose distribution is the responsibility of the DRM system and hence outside the scope of the present invention. The skilled person will appreciate that the content 111 is unusable without the DRM license and that the at least one modification limit ML and the fingerprint FP thus is associated with the content. Another way of associating these values and the content is to include the values in the header of the content, which then advantageously is encrypted. In a preferred embodiment, the content 111 is encrypted as described, and the encryption key K1, the at least one modification limit ML and the fingerprint FP are securely stored, using the second interface 119, on a portable security module (not shown), such as a smartcard, to which only the intended recipient has the necessary access key, while the encrypted content is sent separately.

The content processing system 120 may thus receive the initial content 111, the at least one modification limit ML and the fingerprint FP in a number of different ways. The content processing system 120 comprises a first interface 121 for receiving, preferably encrypted, initial content 111, possibly a separate second interface 122 for receiving the at least one modification limit ML and the fingerprint FP, and a processor 125 for processing the initial content 111. The content processing system 120 further comprises at least one memory 126 adapted for example to store content, a third interface 123, advantageously a user interface, for receiving processing instructions, and a fourth interface 124 for exporting digital content.

The processor 125 may follow the processing instructions to modify the initial content 111, which after the slightest modification becomes modified content. However, the content processing system 120 also comprises an enforcement unit 127 (possibly incorporated in the processor 125 or in a separate processor) that checks for modifications when the content is to be exported (whether the content is modified or not). Within the context of the present invention, the term "exported" comprises saving the content, rendering the content, and sending the content, possibly to a second device. The enforcement unit 127 calculates a second fingerprint FP' for the content, using the same fingerprint method as the content provider system 110.

The enforcement unit 127 then compares if the difference between the initial fingerprint FP and the second fingerprint FP' is within the bounds set by the at least one modification limit ML. If the content has not been modified, the difference between the second fingerprint FP' and the initial fingerprint FP is zero. In this case, the enforcement unit 127 will conclude that no modifications have been done to the content 111 and that the content 111 may be saved or exported.

However, if the content has been modified, then the second fingerprint FP' will be different from the initial fingerprint FP. If the difference is within the bounds set by the at least one modification limit ML, then the enforcement unit 127 allows exportation or saving of the modified content. Continuing the DRM license example hereinbefore, a new DRM license is produced for the content with: the decryption key needed to decrypt the content (not necessarily the same as that received from the content provider system 110), the at least one modification limit ML, and the initial fingerprint FP. It should be noted that it is important to use the initial fingerprint FP, as this allows verification that subsequent modifications are still within the bounds set by the content provider system 110. If the enforcement unit 127 discovers that the difference exceeds the bounds of the at least one modification limit ML, then it may prevent exportation or saving of the modified content, and in an embodiment, the enforcement unit 127 also renders the content and/or the license unusable.

For enhanced safety, it is possible to request that the content consumer device 130 verify that received content that is to be rendered has not been modified more than authorized. In order to do this, the content consumer device 130 comprises a memory 134 intended to store content, a processor 132 adapted to calculate a fingerprint FP''' for the received content, and an enforcer unit 136 (possibly embodied in the processor 132) adapted to compare the calculated fingerprint FP''' and the initial fingerprint FP to see if the difference violates any modification limit ML received with the content. If so, the enforcer unit 136 blocks the rendering of the content and preferably erases the content.

Using the preferred fingerprint method for video described hereinbefore, it is possible to set limits on for example the following aspects of the video with a few examples of possible tolerance regarding modifications:

Spatial factors:
    rotation: $-3°<r<3°$, $r=90°,-90°,180°,-180°$
    zoom: $0.5<z<1.5$
    cropping: removal of 1% of rows and/or columns
    compression: JPEG 25
    insertion: logo (small)
    letterbox (insertion, deletion): symmetrical rows addition or deletion Temporal factors:
    Reordering scenes: summary, teaser
    Scene addition: any number of scenes (e.g.: % of added scenes in MC regarding # scenes in IC)
    Scene removal: any number of scenes (e.g.: % of removed scenes in MC regarding # scenes in IC)
    Frame rate: <15 fs The skilled person will appreciate that a plurality of modification rules MR may be associated with one content, each modification rule MR defining a distinct threshold. A plurality of modification rules MR may give rise to an equal number of modification limits ML, but their number may also be lower than the number of modification rules MR.

Figure 5:
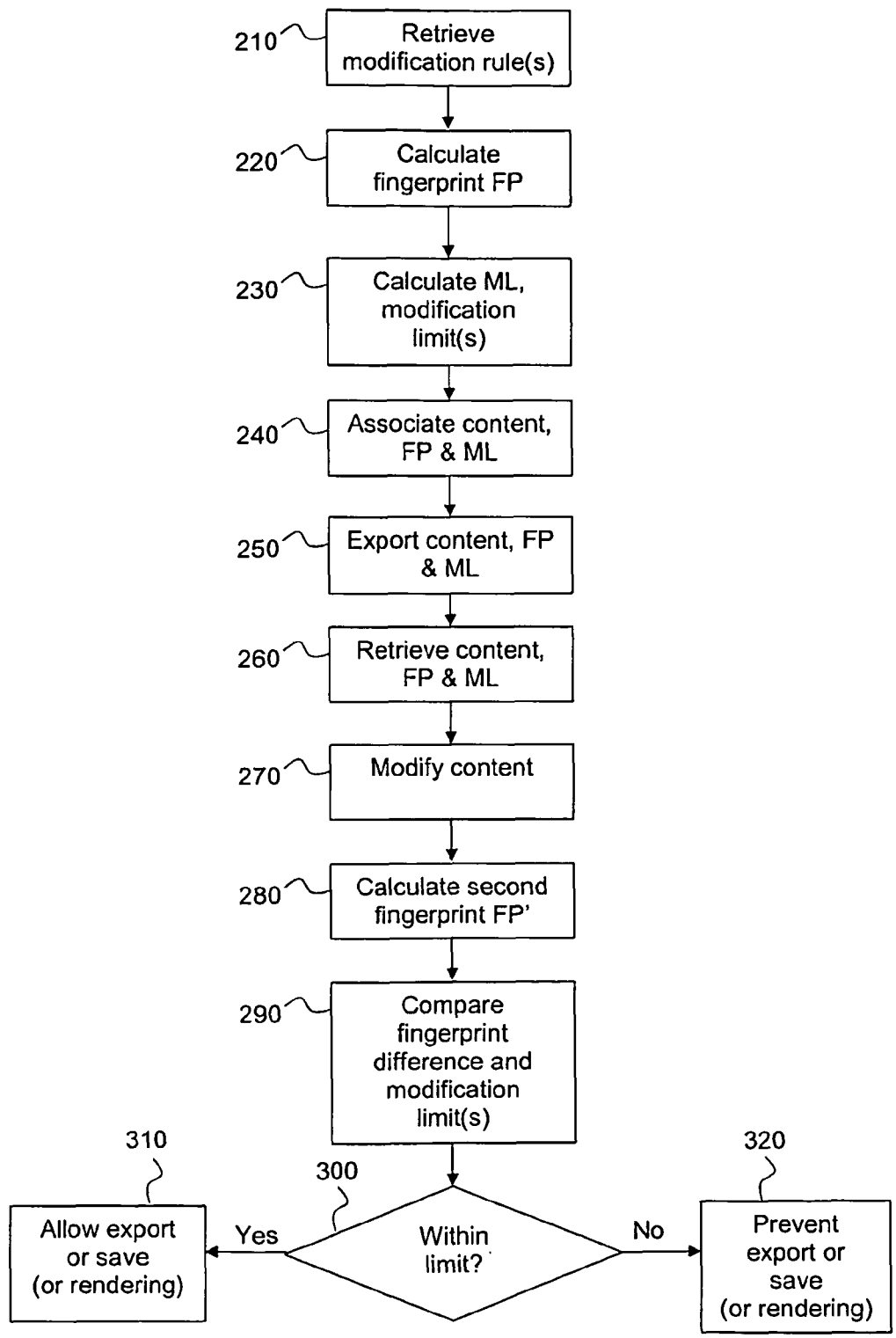
FIG. 5 illustrates a flowchart for a method of content modification detection and protection according to a preferred embodiment of the invention.

FIG. 5 illustrates a flowchart for a method of content modification detection and, in an extended embodiment, protection according to a preferred embodiment of the invention.

A content provider system 110 that stores a content 111, retrieves 210 at least one modification rule MR for the content 111 and calculates 220 a fingerprint FP for the content. It should be noted that the two steps may be performed in an inverse order. At least one modification limit ML is calculated 230 based on the fingerprint FP and the at least one modification rule MR. Then, the content 111 is associated 240 with the fingerprint FP and the at least one modification rule MR, as described hereinbefore. It should be noted that it is possible to associate also the at least one modification rule MR with the content, so as to allow a user to be informed of these. The content 111, the fingerprint FP and the at least one modification limit ML are then exported (although not necessarily together, as it for example is possible for the content 111 to be exported separate from the fingerprint FP and the at least one modification rule ML).

At the content processing system 120, the content 111, the fingerprint FP and the at least one modification limit ML are retrieved 260, and the content 111 is modified 270.

Before saving or exporting the content 111, a second fingerprint FP' is calculated 280, and the difference between the initial fingerprint FP and the second fingerprint FP' is compared 290 with the at least one modification limit ML. It is then verified 300 if the difference is within the bounds set by the at least one modification limit ML. If this is the case ("Yes"), then exportation or saving of the modified content is allowed 310. However, if this is not the case ("No"), then exportation or saving of the modified content is prevented 320.

When the content is exported, it is preferred that the first fingerprint FP and the at least one modification limit ML are exported securely together with the content in order to be able to detect and possibly also restrict further modifications.

It should be noted that steps 260 and 280-320 may also be performed at a content consumer device 130 that retrieves 260 the content 111, the fingerprint FP and the at least one modification limit ML. However, at the content consumer device 130, the content is not modified, so step 270 is not performed.

Before rendering the content 111, a second fingerprint FP' is calculated 280, and the difference between the initial fingerprint FP and the second fingerprint FP' is compared 290 with the at least one modification limit ML. It is then verified 300 if the difference is within the bounds set by the at least one modification limit ML. If this is the case ("Yes"), then rendering is allowed 310. However, if this is not the case ("No"), then rendering is prevented 320 and the content may be erased.

As will be appreciated, the present invention enables control over modifications to digital content without necessarily controlling the tools used for the modifications. Rather, the present invention allows any modification and enforces the modification rules when the modified content is to be saved or exported.

A person skilled in the art will appreciate that the present invention may also be used to protect other kinds of digital data based on a fingerprint calculated using any suitable prior art technique, such as for example music (on CDs and so on).

It will be understood that the present invention has been described purely by way of example. Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. A method for modifying digital content, the method comprising at a device:
   receiving the digital content,
   receiving a first fingerprint calculated from the digital content using a fingerprint calculation method,
   receiving at least one modification limit value for the digital content; wherein the at least one modification limit value has been calculated from the digital content, the first fingerprint and at least one modification rule that expresses a tolerance for modification to the digital content for a factor of the digital content;
   modifying the digital content to obtain modified digital content;
   calculating a second fingerprint from the modified digital content using the fingerprint calculation method;
   comparing a difference between the first fingerprint and the second fingerprint with the at least one modification limit value; and
   exporting the modified digital content only upon determination that the compared difference is within the bounds of at least one modification limit value.

2. The method as claimed in claim 1, wherein the digital content comprises at least one image.

3. The method as claimed in claim 2, wherein the digital content comprises video content.

4. The method as claimed in claim 1, further comprising erasing the digital content if it is detected that any modifications to the digital content is without the limits set by the at least one limit value (MP).

5. The method as claimed in claim 1, wherein exporting the digital content comprises an action chosen from the group of: sending the digital content, saving the digital content, and rendering the digital content.

6. A device for modifying digital content, the device comprising:
   at least one input interface adapted to receive:
      the digital content,
      a first fingerprint calculated from the digital content using a fingerprint calculation method, and
      at least one modification limit value for the digital content; wherein the at least one modification limit value has been calculated from the digital content, the first fingerprint and at least one modification rule that expresses a tolerance for modification to the digital content for a factor of the digital content; and
   a processor adapted to:
      modify the digital content to obtain modified digital content;
      calculate a second fingerprint from the modified digital content using the fingerprint calculation method;
      compare a difference between the first fingerprint and the second fingerprint with the at least one modification limit value; and
      export the modified digital content only upon determination that the compared difference is within the bounds of at least one modification limit value.

7. The device as claimed in claim 6, wherein the at least one input interface comprises a reader for a portable security module.

8. A device for sending digital content, comprising:
   a processor adapted to:
      calculate a fingerprint from the digital content, and at least one modification limit value expressing the limit of allowed modifications to the digital content, the at least one modification limit value being calculated from the digital content, the first digital fingerprint, and at least one modification rule that expresses a tolerance for modification to the digital content for a factor of the digital content; and at least one interface adapted to output the digital content, the fingerprint from the digital content, and the at least one modification limit value.

9. A method for rendering digital content, the method comprising at a content rendering device:
- receiving the digital content,
- receiving a first fingerprint calculated from the digital content using a fingerprint calculation method, and
- receiving at least one modification limit value for the digital content; wherein the at least one modification limit value has been calculated from the digital content, the first digital fingerprint, and at least one modification rule that expresses a tolerance for modification to the digital content for a factor of the digital content;
- calculating a second fingerprint from the received digital content using the fingerprint calculation method;
- comparing a difference between the first fingerprint and the second fingerprint with the at least one modification limit value; and
- rendering the digital content only upon determination that the compared difference is within the bounds of at least one modification limit value.

10. The method as claimed in claim 9, wherein the digital content comprises at least one image.

11. The method as claimed in claim 10, wherein the digital content comprises video content.

12. The method as claimed in claim 9, further comprising erasing the digital content if it is detected that any modifications to the digital content is without the limits set by the at least one limit value (MP).

13. A device for rendering digital content, the device comprising:
- at least one input interface adapted to receive:
  - the digital content,
  - a first fingerprint calculated from the digital content using a fingerprint calculation method, and
  - at least one modification limit value for the digital content; wherein the at least one modification limit value has been calculated from the digital content, the first digital fingerprint, and at least one modification rule that expresses a tolerance for modification to the digital content for a factor of the digital content; and
- a processor adapted to:
  - calculate a second fingerprint from the received digital content using the fingerprint calculation method;
  - compare a difference between the first fingerprint and the second fingerprint with the at least one modification limit value; and
- render the digital content only upon determination that the compared difference is within the bounds of at least one modification limit value.

* * * * *